US011662922B2

(12) United States Patent
Vu et al.

(10) Patent No.: US 11,662,922 B2
(45) Date of Patent: May 30, 2023

(54) SHARED STORAGE ALLOCATION AMONG DATA SERVICES

(71) Applicant: HEWLETT PACKARD ENTERPRISE DEVELOPMENT LP, Houston, TX (US)

(72) Inventors: Hy Dinh Vu, San Jose, CA (US); Murali Krishna Vishnumolakala, San Jose, CA (US); Yihong Xu, Andover, MA (US); Ying Hu, Andover, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 38 days.

(21) Appl. No.: 17/451,245

(22) Filed: Oct. 18, 2021

(65) Prior Publication Data
US 2023/0121626 A1 Apr. 20, 2023

(51) Int. Cl.
G06F 12/00 (2006.01)
G06F 3/06 (2006.01)

(52) U.S. Cl.
CPC .......... G06F 3/0631 (2013.01); G06F 3/0604 (2013.01); G06F 3/0644 (2013.01); G06F 3/0652 (2013.01); G06F 3/0673 (2013.01)

(58) Field of Classification Search
CPC .... G06F 3/0631; G06F 3/0604; G06F 3/0644; G06F 3/0652; G06F 3/0673
See application file for complete search history.

(56) References Cited

U.S. PATENT DOCUMENTS

| 6,151,685 | A | 11/2000 | Li et al. |
| 6,473,830 | B2 | 10/2002 | Li et al. |
| 6,704,839 | B2 | 3/2004 | Butterworth et al. |
| 8,918,619 | B2 | 12/2014 | Yochai et al. |
| 9,274,839 | B2 * | 3/2016 | Schluessler ........... G06F 9/5016 |
| 9,600,337 | B2 | 3/2017 | Karaje et al. |
| 9,842,008 | B2 | 12/2017 | Kimmel et al. |
| 9,946,642 | B2 | 4/2018 | Tomlin et al. |
| 10,284,486 | B2 | 5/2019 | Thyagarajan et al. |
| 10,496,283 | B2 | 12/2019 | Waghulde |
| 2010/0241803 | A1 * | 9/2010 | Starr ..................... G11B 27/002 711/115 |
| 2017/0337966 | A1 * | 11/2017 | Kim ................. G11C 11/40615 |

(Continued)

OTHER PUBLICATIONS

Hewlett Packard Enterprise, Technical White Paper, HPE Nimble Storage Architecture, History and implementation of CASL, 2020 (18 pages).

(Continued)

Primary Examiner — John A Lane
(74) Attorney, Agent, or Firm — Trop, Pruner & Hu, P.C.

(57) ABSTRACT

In some examples, a system allocates a plurality of partitions of a shared storage to respective data services. Based on respective utilizations of the plurality of partitions, the system selects, for a given data service of the data services, between a global storage apportionment process to rebalance shares of the shared storage among the data services, and a local storage apportionment process, where the rebalancing includes releasing a partition of the given data service, and the local storage apportionment process comprising freeing segments within the partition of the given data service.

20 Claims, 5 Drawing Sheets

(56) References Cited

U.S. PATENT DOCUMENTS

2020/0184350 A1    6/2020  Bhide et al.
2021/0011623 A1\*  1/2021  Fay ........................ G06F 3/0688

OTHER PUBLICATIONS

Nimble Storage, CASL Hybrid Storage Architecture downloaded Aug. 25, 2021 (2 pages).

Nimble Storage, Feature Primer, Cache Accelerated Sequential Layout (CASL) Architecture, 2013 (3 pages).

\* cited by examiner

SHARED STORAGE ALLOCATION AMONG DATA SERVICES

BACKGROUND

A storage system can be used to store data that is accessible by data requesters. A data requester can include a computer that is able to issue access requests to the storage system to access the data. The computer can be coupled to the storage system over a network.

BRIEF DESCRIPTION OF THE DRAWINGS

Some implementations of the present disclosure are described with respect to the following figures.

Figure 1:
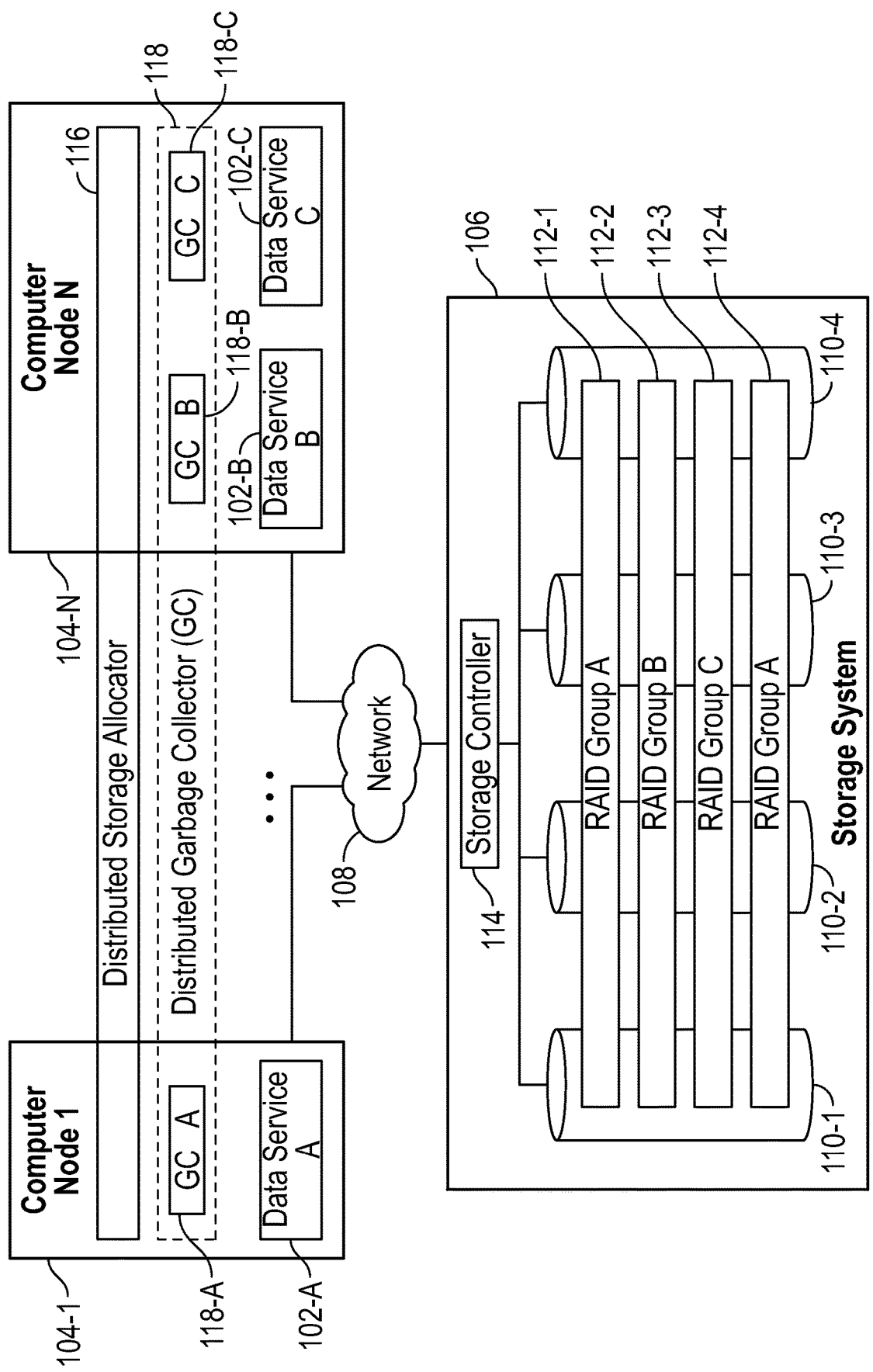
FIG. 1 is a block diagram of an arrangement including computer nodes and a storage system, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A storage system includes a collection of storage devices. A "collection" of storage devices can include a single storage device or multiple storage devices. In some examples, a storage system may store data in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

In some examples, a storage system can provide a shared storage that is accessible by multiple entities. In the ensuing discussion, the entities that are able to access the shared storage are referred to as data services. A "data service" can include various components that allow the data service to access a respective portion of the shared storage. For example, a data service can include a stack of components that allow the data service to access a portion of the of the shared storage. The components can include any or some combination of the following: a file system, a layer that provides support for a particular storage, such as a Small Computer System Interface (SCSI) protocol or another storage protocol, a service to support Redundant Array of Independent Disks (RAID) storage across storage devices of the shared storage, a service to perform data deduplication, a service to perform data compression, so forth.

FIG. 1 shows an example in which data services 102-A, 102-B, and 102-C are executed in respective computer nodes 104-1, . . . , 104-N. In the example of FIG. 1, multiple computer nodes 104-1 to 104-N are depicted, in an example where N 2. In other examples, there can just be one computer node that executes multiple data services. In the example of FIG. 1, the data service 102-A executes in the computer node 104-1, and the data services 102-B and 102-C execute in the computer node N. In some examples, computer nodes 104-1 to 104-N can be part of a cluster of computer nodes.

Although three data services are depicted in FIG. 1, in other examples, less than three or more than three data services can be provided that are able to access the storage system 106.

The data services 102-A, 102-B, and 102-C are able to access a storage system 106 over a network 108. Examples of the network 108 include any or some combination of the following: a local area network (LAN), a wide area network (WAN), a public network (e.g., the Internet), a storage area network (SAN), or any other type of network.

In further examples, multiple storage systems may be coupled to the network 108 that are accessible by the data services 102-A, 102-B, and 102-C.

The storage system 106 includes a collection of storage devices 110-1, 110-2, 110-3, and 110-4. Although the example of FIG. 1 shows four storage devices, in other examples, a different quantity of storage devices can be employed.

The collection of storage devices 110-1 to 110-4 make up a shared storage that can be shared by the data services 102-A, 102-B, and 102-C.

In some examples, the shared storage can be divided into multiple partitions that can be allocated to respective data services. In an example, a data service is able to access (read or write) data in a partition allocated to the data service, but is unable to access data in a partition allocated to another data service. Generally, each data service can be allocated a collection of partitions of the shared storage, where the "collection" of partitions can include one partition or multiple partitions.

In examples where RAID is implemented, the different partitions can include different RAID groups 112-1, 112-2, 112-3, and 112-4. A "RAID group" refers to a portion of the collection of storage devices 110-1 to 110-4 that provides RAID storage of data for a corresponding data service. RAID refers to techniques for storing data where data redundancy is supported to protect against data loss in case of a fault, e.g., an error in retrieved data or a failure of hardware or machine-readable instructions.

In other examples, RAID is not employed.

There are several RAID levels. RAID 1 maintains a mirror copy of primary data, to provide protection for the primary data. For example, the primary data can be stored in a first storage device, and the mirror copy of the primary data can be stored in a second storage device. In other examples, multiple mirror copies of the primary data can be stored in respective second storage devices. A mirror copy of the primary data can be used to recover the primary data in case of corruption of the primary data, which can be due to a fault of hardware or machine-readable instructions, or due to other causes. As used here, "primary data" refers to the original data that was written to a storage system. A mirror copy of the primary data is a duplicate of the primary data.

Other RAID levels employ parity information to protect primary data stored in the storage system. As used here, the term "parity information" refers to any additional information (stored in addition to data and computed based on applying a function to the data) that can be used to recover the primary data in case of corruption of the primary data.

Examples of RAID levels that implement parity information include RAID 3, RAID 4, RAID 5, RAID 6, and so forth. For example, RAID 5 employs a set of M+1 (M≥3) storage devices that stores stripes of data. A "stripe of data" refers to a collection of pieces of information across the multiple storage devices of the RAID storage system, where the collection of pieces of information include multiple segments of data (which collectively make up primary data) and associated parity information that is based on the multiple segments of data. For example, parity information can be generated based on an exclusive OR (or other function) applied on the multiple segments of data in a stripe of data.

For each stripe of data, parity information is stored in one of the M+1 storage devices, and the associated segments of data are stored in the remaining ones of the M+1 storage devices. For RAID 5, the parity information for different stripes of data can be stored on different storage devices; in other words, there is not one storage device that is dedicated to storing parity information. For example, the parity information for a first stripe of data can be stored on a first storage device, the parity information for a second stripe of data can be stored on a different second storage device, and so forth.

RAID 6 employs M+2 storage devices in which two of the storage devices are used to store respective pieces of parity information for a stripe of data. Whereas RAID 5 can recover from a fault of one storage device, RAID 5 can recover from a fault of two storage devices.

RAID 3 or 4 (as well as a RAID level above RAID 6) also employs parity information to protect primary data.

In a RAID N (N≥3) storage system, if any piece of information (segment of data or piece of parity information) in the stripe of data were to be corrupted for any reason, the remaining pieces of information in the stripe of data can be used to recover the corrupted piece of information.

The storage system 106 includes a storage controller 114 that manages access of data in the collection of storage devices 110-1 to 110-4. Although just one storage controller 114 is depicted in FIG. 1, in other examples, the storage system 106 can include multiple storage controllers that manage access of the data in the storage devices 110-1 to 110-4.

In further examples, the storage controller(s) 114 can be external of the storage system 106.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In examples where RAID is implemented, the storage controller 114 manages RAID storage of data. In FIG. 1, the RAID groups 112-1 and 112-4 are allocated to the data service 102-A, the RAID group 112-2 is allocated to the data service B, and the RAID group 112-3 is allocated to the data service 102-C. More generally, each data service can be allocated a collection of RAID groups, where a "collection" of RAID groups can refer to one RAID group or multiple RAID groups.

The computer nodes 104-1 to 104-N can execute a distributed storage allocator 116 that performs allocation of RAID groups to respective data services, or more generally, allocation of partitions (as well as segments in the partitions) of the storage system 106 to respective data services. The distributed storage allocator 116 is "distributed" in the sense that multiple storage allocator instances can execute, in a coordinated manner, across multiple computer nodes to perform allocation of storage to data services. In other examples, a storage allocator can execute in less than all of the computer nodes 104-1 to 104-N, or can execute on computer(s) separate from the computer nodes 104-1 to 104-N.

A partition (such as a RAID group) can include multiple segments. A segment in turn can include blocks, where a block is a unit of stored data. In some examples, blocks can have variable sizes. In other examples, blocks can have a fixed size. In examples where RAID is employed, a segment can include a full RAID stripe across the collection of storage devices 110-1 to 110-4, where a "full RAID stripe" includes all of the data pieces and redundancy information to allow for recovery of data in the full RAID stripe in case of a fault. More generally, a "segment" can refer to a logical structure of a specified size (or of a variable size) into which data can be stored.

An issue associated with shared storage that has been divided for use by multiple data services is fairness in usage of the shared resource. In some cases, one data service may have insufficient storage space allocated to the data service, which can cause the data service's performance to suffer. In other cases, another data service may have too much storage space allocated to the other data service, which is wasteful of storage allocation.

In accordance with some implementations of the present disclosure, fairness-based and usage-based storage apportionment is provided to select between a global storage apportionment process in which a data service cleans a partition (e.g., a RAID group) allocated to the data service so that the partition can be freed for use by another data service (to achieve fairness in allocation of partitions based on usage of the partitions), and a local storage apportionment process in which the data service locally performs cleaning of segments in a partition allocated to the data service.

"Cleaning" a partition or a segment can refer to identifying storage locations that are no longer used and reclaiming those storage locations for use by entities. Cleaning is performed by a garbage collection process.

In some examples, the fairness-based and usage-based storage apportionment is performed during a garbage collection process as executed by a distributed garbage collector (GC) 118 that includes GC instances 118-A, 118-B, and 118-C executed on respective computer nodes 104-1 and 104-N.

In further examples, the distributed storage allocator 116 can also apply a fairness-based and usage-based storage apportionment when allocating portions of shared storage to data services.

In some examples, one GC instance is associated with each respective data service. Thus, the GC instance 118-A is associated with the data service 102-A, the GC instance 118-B is associated with the data service 102-B, and the GC instance 118C is associated with the data service 102-C. Each GC instance performs a garbage collection process for a respective data service. In examples where there are more data services, more GC instances are associated with the respective data services. The GC instance 118-A executes in the computer node 104-1, and the GC instances 118-B and 118-C execute in the computer node 104-N.

Although FIG. 1 shows GC instances executing on the same computer nodes as their respective data services, it is noted that in other examples, a GC instance can execute on a different computer node than a data service that the GC instance is associated with. Also, in further examples, a GC instance may be included as part of the respective data service.

A garbage collection process refers to a storage management process in which no longer used storage locations are reclaimed for use by entities, such as the data services 102-A, 102-B, and 102-C. The no longer used storage locations may have been previously allocated for use by an entity (e.g., a data service), which for whatever reason may no longer use such storage locations.

For example, a first data service can employ a technique in which data is written sequentially to a storage. The data service does not perform in-place overwrites of data. Rather, a write of data to a given address is written to a new sequential storage location rather than written in place to a previous storage location at which data of the address was stored. As a result of the overwrite, the previous storage location would no longer be used and thus a GC instance can reclaim the previous storage location for use by the data service or another data service.

Another example that can result in a storage location no longer being used is if a delete were requested of the data in the storage location.

In accordance with some implementations of the present disclosure, each GC instance 118-A, 118-B, or 118-C can apply a fairness-based and usage-based storage apportionment during garbage collection. Each GC instance (any of GC instances 118-A, 118-B, and 118-C) can selectively perform a global storage apportionment process based on both global information and local information or a local storage apportionment process based on local information (and not global information). The "local information" and "global information" considered are discussed in further detail below.

Figure 2:
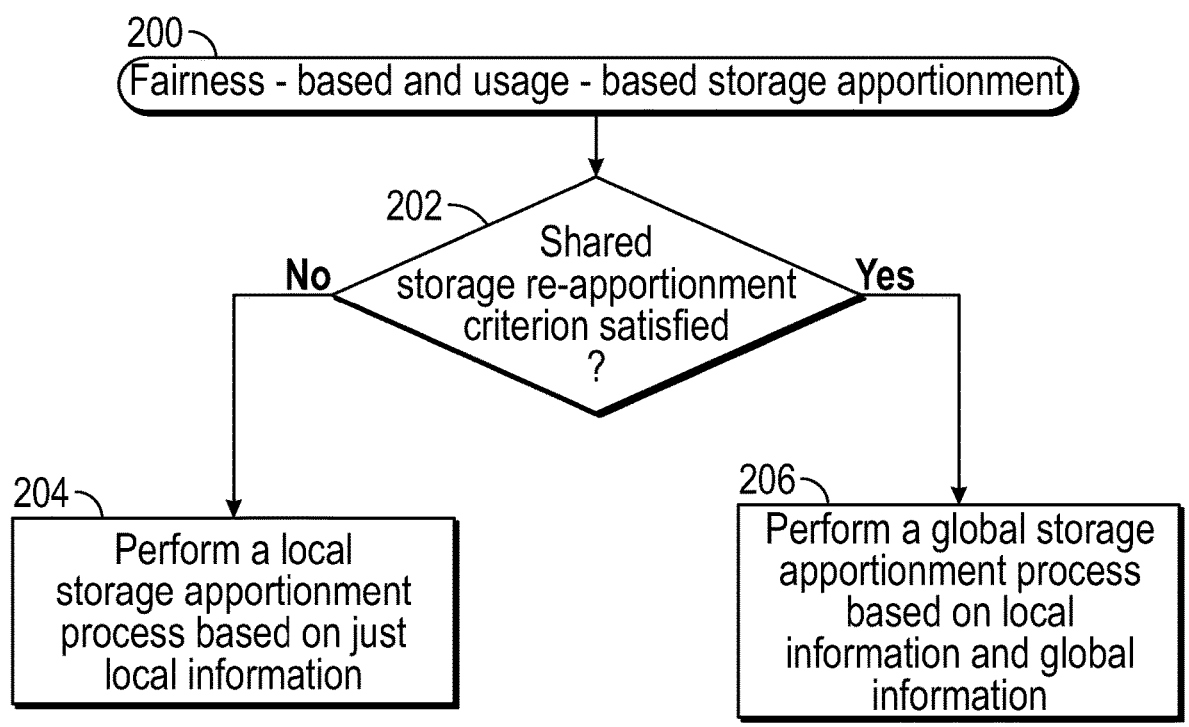
FIG. 2 is a flow diagram of a fairness-based and usage-based storage apportionment process among data services, according to some examples.

FIG. 2 is a flow diagram of a fairness-based and usage-based storage apportionment process 200 according to some implementations of the present disclosure. The process 200 can be performed by a GC instance w (any of GC instances 118-A, 118-B, and 118-C of FIG. 1), for example. The GC instance w is associated with a data service w (one of data services 102-A, 102-B, and 102-C).

The process 200 determines (at 202) whether a shared storage re-apportionment criterion is satisfied. The shared storage re-apportionment criterion can consider a single factor or multiple factors. A first factor that can be considered includes a space usage pressure associated with each data service. The space usage pressure of a given data service is represented by a measure based on relative usage of a storage space allocated to the given data service. The storage space allocated to the given data service can include one partition or multiple partitions of the shared storage. For example, the measure based on relative usage of the storage space allocated to the given data service can be calculated by computing a ratio between a free storage space and a used storage space associated with the given date of service. The free storage space associated with the given data service refers to an amount of the allocated storage space (allocated to the given data service) that remains free for accepting data writes. The used storage space of the allocated storage space refers to an amount of the allocated storage space that is already consumed (i.e., data has been written by the given data service to the used storage space). In other examples, the measure based on relative usage of the allocated storage space (allocated to the given data service) can be expressed as a percentage of the allocated storage space that has been consumed by the given data service. In further examples, other measures based on relative usage of the allocated storage space as allocated to the given data service can be employed.

In some examples, the shared storage re-apportionment criterion is satisfied if values of space usage pressure measures associated with respective data services are substantially the same. Values of space usage pressure measures are substantially the same if they are within a specified threshold difference of one another. For example, the specified threshold difference can be a z % percent difference, where z can be any specified value. Thus, a first space usage pressure measure is substantially the same as a second space usage pressure measure if the first and second space usage pressure measures are within z % of one another. However, if the first and second space usage pressure measures differ by greater than z %, then the space usage pressure measures are not substantially the same.

A second factor that can be considered as part of the shared storage re-apportionment criterion includes whether a skew is present among scores computed for respective partitions, such as the RAID groups 112-1, 112-2, 112-3, and 112-4 of FIG. 1. Each score computed for a corresponding partition can be computed based on a utilization of the partition. In further examples, the score computed for the partition can further be based on other parameters, including an age of the partition, and so forth.

In some examples, the shared storage re-apportionment criterion is satisfied if skew is present among the scores computed for respective partitions. Skew is present in the scores if the scores differ by greater than a specified threshold (e.g., the scores differ by greater than v %), where v is a specified value.

In response to determining that the shared storage re-apportionment criterion is not satisfied, the process 200 performs (at 204) a local storage apportionment process based on just local information associated with partition(s) allocated to the data service x. The local information is based on utilizations (and possibly age and/or other parameters) of segments of the partition(s) (e.g., RAID group(s)) allocated to the data service x.

The local storage apportionment process can include identifying segments of a partition allocated to the data service x for cleaning so that the identified segments can be freed for allocation to another write operation of the data service x.

In response to determining that the shared storage re-apportionment criterion is satisfied, the process 200 performs (at 206) a global storage apportionment process that is based on both the local information associated with the data service x and global information that includes information associated with other data services. Global information associated with another data service can be based on utilizations (and possibly age and/or other factors) of respective partition(s) (e.g., RAID group(s)) by the other data service.

The global storage apportionment process can include cleaning a partition allocated to the data service x to free the partition for use by another data service.

Figure 3:
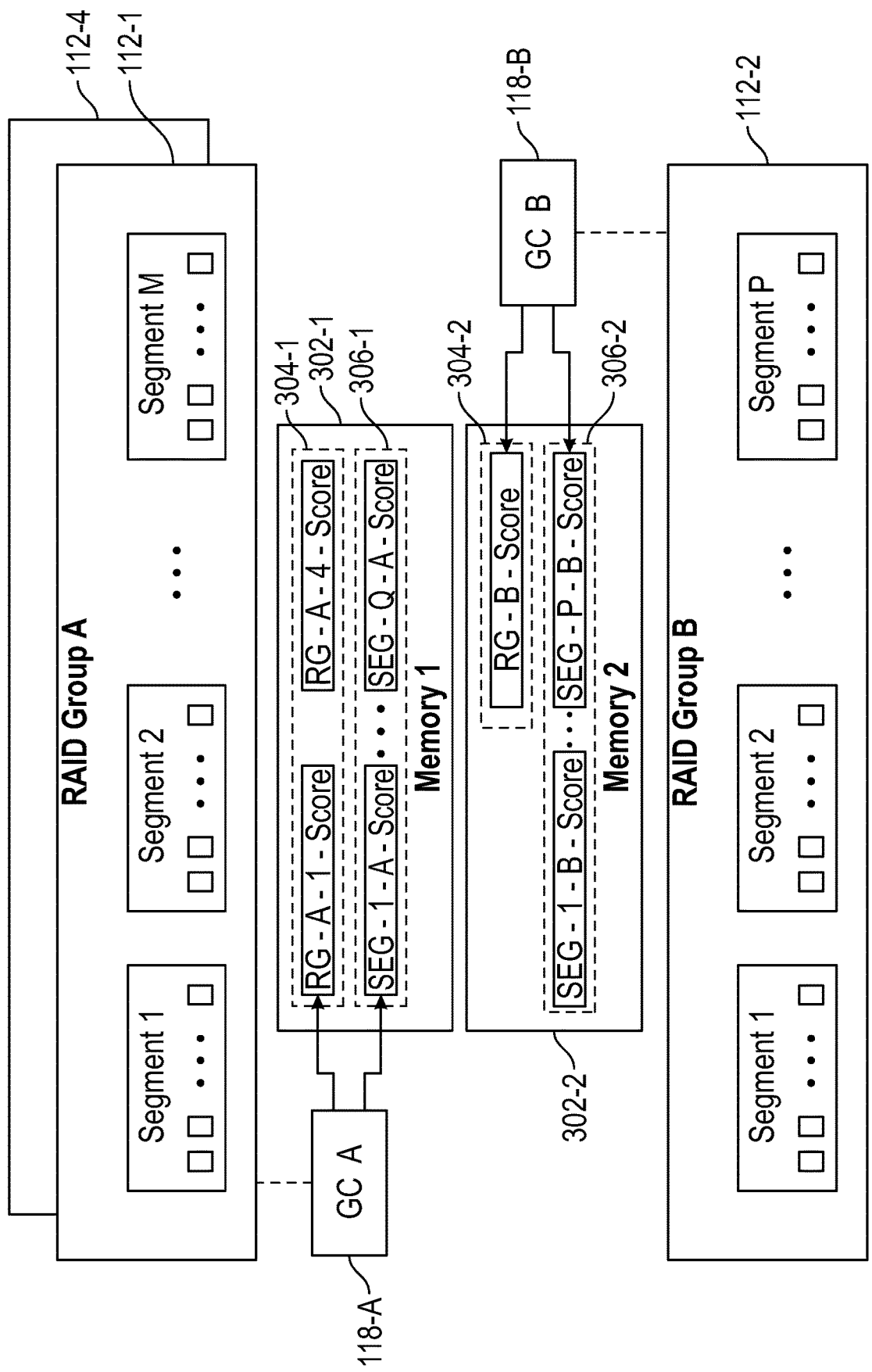
FIG. 3 is a block diagram of garbage collection instances that compute various scores for partitions, according to some examples.

FIG. 3 shows an example arrangement that includes GC instance 118-A and GC instance 118-B. The GC instance 118-A is associated with the data service 102-A that has allocated the RAID groups 112-1 and 112-4 by the distributed storage allocator 116, and the GC instance 118-B is associated with the data service 102-B that has been allocated the RAID group 112-2 by the distributed storage allocator 116.

Note that the GC instance 118-C and its associated RAID group 112-3 are not shown in FIG. 3 for purposes of brevity.

Although the ensuing discussion refers to RAID groups, it is noted that techniques or mechanisms discussed herein are applicable to other types of partitions that can be allocated to respective data services.

As shown in FIG. 3, the RAID group 112-1 includes M (M≥1) segments, and the RAID group 112-2 includes P segments (P≥1). Note that M can be the same as or different from P. The RAID group 112-4 can also include M segments (or a different quantity of segments).

Each segment can include a quantity of blocks, represented by square boxes in each of the segments shown in FIG. 3.

Each GC instance calculates various scores associated with the RAID groups and segments.

In examples according to FIG. 3, the GC instance 118-A computes RAID group scores (including RG-A-1-Score and RG-A-4-Score) and segment scores (including SEG-1-A-Score to SEG-Q-A-Score), where Q is a number that is based on a sum of the quantity of segments (M) in the RAID group 112-1 and the quantity of segments in the RAID group 112-4, which are both allocated to the data service 102-A. RG-A-1-Score is computed for the RAID group 112-1, and RG-A-4-Score is computed for the RAID group 112-4. SEG-1-A-Score is computed for a segment in the RAID group 112-1 or 112-4, and SEG-Q-A-Score is computed for a segment in the RAID group 112-1 or 112-4. There can be additional segment scores computed for other segments in the RAID groups 112-1 and 112-4.

Similarly, the GC instance 118-B computes a RAID group score (RG-B-Score) and segment scores (SEG-1-B-Score to SEG-P-B-Score). In the example of FIG. 3, there is just one RAID group score computed by the GC instance 118-B, since there is just one RAID group 112-2 allocated to the data service 102-B.

The various scores computed by the GC instance 118-A can be stored in a memory 302-1, which can be included in the computer node 104-1 in some examples. A "memory" can refer to a collection of memory devices (including just one memory device or multiple memory devices), such as any or some combination of the following: a dynamic random access memory (DRAM) device, a static random access memory (SRAM) device, a non-volatile random access memory (NVRAM) device, and so forth.

The various scores computed by the GC instance 118-B can be stored in a memory 302-2, which can included in the computer node 104-N in FIG. 1 in some examples.

A RAID group score (e.g., any of RG-A-1-Score, RG-A-4-Score, RG-B-Score) can be computed as follows:

$$RG-x-\text{Score} = \frac{1-\mu_{RG}}{2\mu_{RG}} \cdot RGAge^k \cdot L, \quad \text{(Eq. 1)}$$

where $\mu_{RG}$ represents a utilization of the respective RAID group x, RGAge represents an age associated with the respective RAID group x, k is an age bias factor, and L is a compaction bias factor.

A segment score is computed as follows:

$$SEG-y-x-\text{Score} = \frac{1-\mu_{SEG}}{2\mu_{SEG}} \cdot SEGAge^k, \quad \text{(Eq. 2)}$$

where $\mu_{RG}$ represents a utilization of the respective segment y that is part of RAID group x, and SEGAge represents an age of segment y.

In other examples, a RAID group score and a segment score can be computed in a way that is different from Equations 1 and 2.

In some examples, the segment age (SEGAge) is an age of the segment since creation of the segment or allocation of the segment to a RAID group. The segment age (SEGAge) is expressed in units of time, for example. In further examples, SEGAge(X) for a given segment X is expressed as: SEGAge(X)=latest segment ID−segment X ID, where a segment ID refers to an identifier of a segment. As more segments are added, segment identifiers monotonically increase, so that the difference between the identifier of segment X (segment X ID) and the identifier of the latest added segment (latest segment ID) increases as more segments are added. In such examples, SEGAge(X) provides an indirect measure of the age of segment X that is not expressed in a unit of time.

Although the same age bias factor (k) is used in Equation 2 to compute the segment score, in other examples, a different age bias factor (different from k used to compute the RAID group score of Equation 1) can be employed for calculating the segment score.

In further examples, an age bias factor is not used (i.e., k=1) in computing the segment score and/or the RAID group score.

In Equation 1, the age of the RAID group (RGAge) is computed as an average or median (or some other mathematical aggregate) of the ages (SEGAge) of the segments that are part of the respective RAID group x.

The segment utilization ($\mu_{SEG}$) refers to a measure of a portion of the segment that is used for "live data," where "live data" can refer to valid data that is actually to be used by a respective data service. Invalid (or dead) data refers to data that was previously live but is no longer valid, e.g., the data has been deleted or has been overwritten.

In some examples, $\mu_{SEG}$ can be expressed as a percentage of a segment used for live data. In other examples, $\mu_{SEG}$ can be a different type of measure that represents a portion of the segment use for live data.

The RAID group utilization ($\mu R_G$) can be computed as an average or median (or some other mathematical aggregate) of utilizations ($\mu_{SEG}$) of the segments in the RAID group.

The compact compaction bias factor (L) in Equation 1 is a bias factor to assign more weight to a less utilized RAID group (to increase the likelihood that the less utilized RAID group is selected for cleaning, either as part of the local storage apportionment process or global storage apportionment process. Note that different RAID groups can be assigned different values of the compaction bias factor (L). The reason for assigning greater weight to a less utilized RAID group is that, when deciding whether or not to clean a RAID group, it is more desirable to select a RAID group that is less utilized than one that is more utilized. Cleaning a RAID group is associated with usage of resources, and thus selecting a less utilized RAID group for cleaning is more efficient than selecting a greater utilized RAID group for cleaning.

In some examples, the value of L can vary based on utilization of a RAID group, such as according to Table 1 below:

TABLE 1

| Utilization | L |
|---|---|
| $\mu_{RG} \leq 10\%$ | 1 |
| $10\% < \mu_{RG} \leq 20\%$ | 0.9 |
| $20\% < \mu_{RG} \leq 30\%$ | 0.8 |
| ... | |

Thus, if the utilization ($\mu_{RG}$) is less than or equal to 10%, L is set to 1; if $\mu_{RG}$ is greater than 10% and less than or equal to 20%, then L is set to 0.9; if $\mu_{RG}$ is greater than 20% and less than or equal to 30%, then L is set to 0.8; and so forth.

As can be seen from Table 1, the value of L is inversely proportional to the value of $\mu_{RG}$. In other examples, the table can correlate different ranges of values of $\mu_{RG}$ to different values of L.

In other examples, L can be computed based on $\mu_{RG}$ in a different way, such as according to an equation or according to a different table.

In further examples, the compaction bias factor (L) is not used to compute a RAID group score.

Generally, the RAID group scores and the segment scores are computed in a way that biases selection of less utilized and older RAID groups or segments for cleaning.

Figure 4:
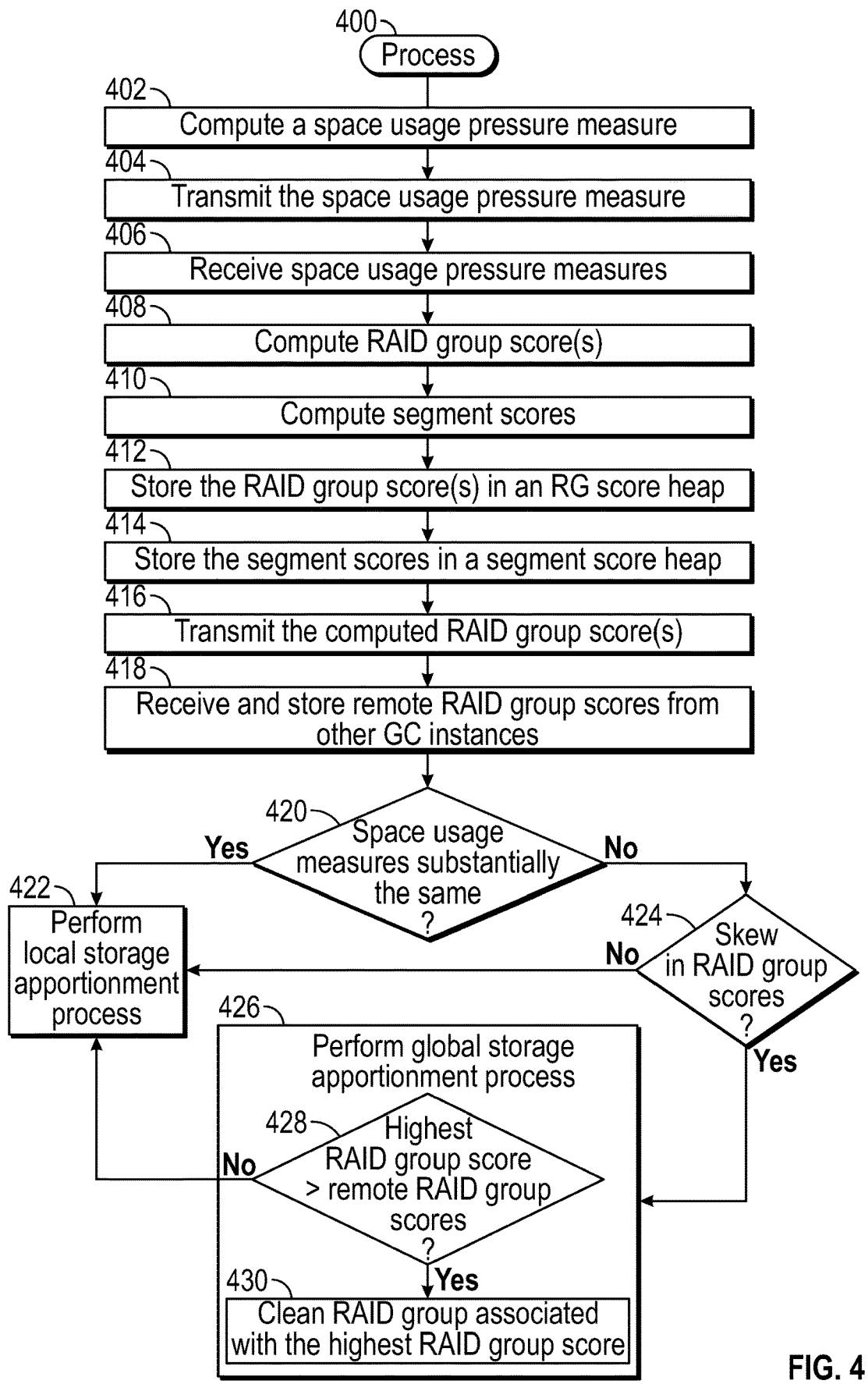
FIG. 4 is a flow diagram of a process according to further examples.

FIG. 4 is a flow diagram of a process 400 according to some examples. The process 400 can be performed by a GC instance w (any of 118-A to 118-C in the example of FIG. 1). The GC instance w is associated with a data service w.

The GC instance w computes (at 402) a space usage pressure measure for the data service w. The GC instance w transmits (at 404) the space usage pressure measure for the data service w to other GC instances. The GC instance w also receives (at 406) space usage pressure measures computed by other GC instances.

The GC instance w computes (at 408) a RAID group score for each RAID group allocated to the data service w associated with the GC instance w. The GC instance w also computes (at 410) the segment scores for the segments in the RAID group(s) allocated to the data service w associated with the GC instance w.

The GC instance w stores (at 412) the computed RAID group score(s) for the data service w in an RG score heap that is contained in a respective memory. The process 400 stores (at 414) the segment score(s) computed for the segments in a segment score heap that is contained in the respective memory.

For example, in FIG. 3, the RG-A-1-Score and RG-A-4-Score computed by the GC instance 118-A can be stored in an RG score heap 304-1. The RAID group scores can be sorted in the RG score heap 304-1 according to the values of the RAID group scores. In some examples, a higher RAID group score indicates a higher benefit to selecting the RAID group for cleaning, and thus, a higher RAID group score can be placed first in the RG score heap 304-1.

In FIG. 3, the segment scores (SEG-1-A-Score to SEG-Q-A-Score) computed by the GC instance 118-A can be stored in a segment score heap 306-1. The segment scores in the segment score heap 306-1 can be sorted according to the values of the segment scores. A higher segment score indicates a greater benefit to selecting the segment for cleaning, and thus, a higher segment score can be ordered first in the segment score heap 306-1.

Although reference is made to examples where a higher RAID group score or a higher segment score indicates a higher benefit to selecting the respective RAID group or segment for cleaning, in other examples, a lower RAID group score or a lower segment score indicates a higher benefit to selecting the respective RAID group score or segment for cleaning.

The RG score heap 304-1 and the segment score heap 306-1 are contained in the memory 302-1.

Similarly, in FIG. 3, the RAID group score (RG-B-Score) computed by the GC instance 118-B is stored in an RG score heap 304-2, and the segment scores (SEG-1-B-Score to SEG-P-B-Score) computed by the GC instance 118-B are stored in a segment score heap 304-306-2. The RG score heap 304-2 and the segment score heap 306-2 is stored in the memory 302-2. Note that the RG score heap 304-2 for the data service 102-B includes just one RAID group score since there is just one RAID group allocated to the data service 102-B.

The RG score heap 304-2 and the segment score heap 306-2 are contained in the memory 302-2.

The GC instance w also transmits (at 416) its computed RAID group score(s) to other GC instances of the distributed GC 118 (FIG. 1). The GC instance w also receives and stores in memory (at 418) RAID group scores computed by other GC instances of the distributed GC 118. The RAID group scores received from the other GC instances are referred to as "remote" RAID group scores.

The GC instance w determines (at 420) whether the space usage pressures for the different data services are substantially the same (as explained further above). In the example of FIG. 1, there are three data services 102-A, 102-B, and 102-C, and thus, there will be three space usage pressure measures computed for the respective three data services.

If the space usage pressure measures are substantially the same, the GC instance w performs (at 422) a local storage apportionment process. In the local storage apportionment process, the GC instance w considers just the RAID group(s) associated with the data service w associated with the GC instance w. Thus, for GC instance 118-A, the local storage apportionment process would consider just the RAID groups 112-1 and 112-4. For the GC instance 118-B, the local apportionment process would consider just the RAID group 112-2.

Assuming multiple RAID groups are allocated to the data service w, in the local storage apportionment process, the GC instance w selects (based on the RAID group scores computed for the multiple RAID groups, such as according to Equation 1 above) one of multiple RAID groups on which cleaning is to be applied, and within the selected RAID group, the GC instance w selects (based on segment scores computed for the segments in the selected RAID group) segment(s) to clean. For example, a segment selected for cleaning can be one having a highest segment score.

When cleaning a selected segment, the GC instance w identifies dead blocks in the selected segment. A dead block can be identified based on an index that refers to valid blocks. As data is written to blocks in a segment, the index is updated to refer to the blocks to which data is written. When data in a first block is overwritten with new data, the new data is written to a second block in the segment rather than to the first block. The index is updated to refer to the second block, and no longer refers to the first block (which at this point is a dead block). Similarly, if data in the first block is deleted, the index is updated to no longer refer to the first block. The GC instance w can process the index to determine which blocks of the selected segment are dead. In other examples, other techniques of identifying dead blocks can be employed. A "dead" block is a block that no longer stores valid data.

The GC instance w reclaims the identified dead blocks in the selected segment to make available for use in subsequent write operations. Also, the local storage apportionment process (422) can make a determination of whether live blocks in the selected segment are to be moved to another RAID group, such that the selected segment can be cleaned and made available for another write operation. The determination of whether live blocks in the selected segment are to be moved can be based on any of various techniques.

In response to determining (at 422) that the space usage measures are not substantially the same, the GC instance w determines (at 424) if there is skew in the RAID group scores of the corresponding RAID groups allocated to the various data services. Skew is present among the RAID group scores if the RAID group scores differ by greater than a specified threshold (e.g., the RAID group scores differed by greater than v %).

In examples where multiple RAID groups are allocated to a particular data service, the RAID group score that is compared for purposes of determining whether skew is present is the highest RAID group score in some examples.

If the RAID group scores are not sufficiently skewed (a difference among the RAID group scores does not exceed the specified threshold), then the GC instance w can perform (at 422) the local storage apportionment process.

If the RAID group scores are sufficiently skewed (the difference among the RAID group scores exceeds the specified threshold), then the GC instance w performs (at 426) a global storage apportionment process. In the global storage apportionment process, the GC instance w determines (at 428) if its highest RAID group score is greater than all of the remote RAID group scores. If so, the GC instance w cleans (at 430) a RAID group associated with the highest RAID group score (by cleaning all segments in the RAID group), to release the RAID group so that another data service can be allocated the released RAID group. If the highest RAID group score of the GC instance w is not greater than all of the remote RAID group scores, then the GC instance w can perform (at 422) the local storage apportionment process.

In further examples, in addition to performing a fairness-based and usage-based storage apportionment during garbage collection, the distributed storage allocator 116 can also perform a fairness-based and usage-based storage apportionment when allocating RAID groups to data services. For example, the distributed storage allocator 116 can consider space usage pressure measures and RAID group scores when allocating a new RAID group to a given data service. For example, a low space usage pressure measure (indicating a low percentage of utilization of a storage space allocated to the given data service) may be used by the distributed storage allocator 116 to make a determination that a new RAID group should not be allocated to the given data service, since the given data service has a lot of storage space available for use. As another example, if the RAID group scores for RAID groups allocated to the given data service indicate that a RAID group of the given data service should be cleaned and freed for re-allocation, then the distributed storage allocator 116 would not allocate a new RAID group to the given data service.

Figure 5:
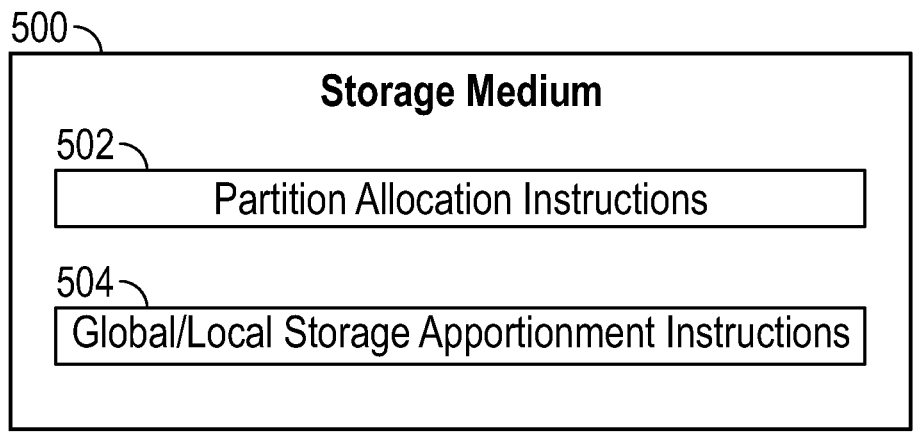
FIG. 5 is a block diagram of a storage medium storing machine-readable instructions, according to some examples.

FIG. 5 is a block diagram of a non-transitory machine-readable or computer-readable storage medium 500 storing machine-readable instructions that upon execution cause a system to perform various tasks.

The machine-readable instructions include partition allocation instructions 502 to allocate a plurality of partitions (e.g., RAID groups) of a shared storage to respective data services. The partition allocation instructions 502 may be part of the distributed storage allocator 116, for example.

The machine-readable instructions include global/local storage apportionment selection instructions 504 to, based on respective utilizations of the plurality of partitions, select, for a given data service of the data services, between a global storage apportionment process to rebalance shares of the shared storage among the data services, and a local storage apportionment process. The rebalancing includes releasing a partition of the given data service for allocation to another data service (such as by the partition allocation instructions 502), and the local storage management process includes freeing (cleaning) segments within the partition of the given data service.

In some examples, the selecting between the global storage apportionment process and the local storage apportionment process is performed as part of a garbage collection process. Doing this selection during the garbage collection process allows the garbage collection process to apportion storage space that considers utilizations and ages of partitions and segments, so that fairness and efficiency can be enforced in usage of the partitions and segments.

In some examples, the global storage apportionment process is selected in response to a difference between indicators of utilizations (e.g., space pressure measures) of respective storage spaces of the shared storage by the respective data services exceeding a threshold difference. In some examples, a storage space used by a data service includes one or more partitions. If the space pressure measures of the respective storage spaces of the shared storage by the respective data services do not exceed the threshold difference, then utilization of the shared storage space is fairly allocated and the global storage apportionment process would not have to be triggered.

In some examples, scores are computed for respective partitions (e.g., RAID group scores computed according to Equation 1). Each score of the scores for a corresponding partition is based on a utilization and possibly age of the corresponding partition by a corresponding data service. The global storage apportionment process is selected for the given data service in response to a comparison of the scores. The computed scores provide an objective way by which a determination can be made of which partition should be cleaned and freed for use by another data service to achieve a higher benefit (e.g., bias selection of less utilized and older partitions or segments for cleaning).

Figure 6:
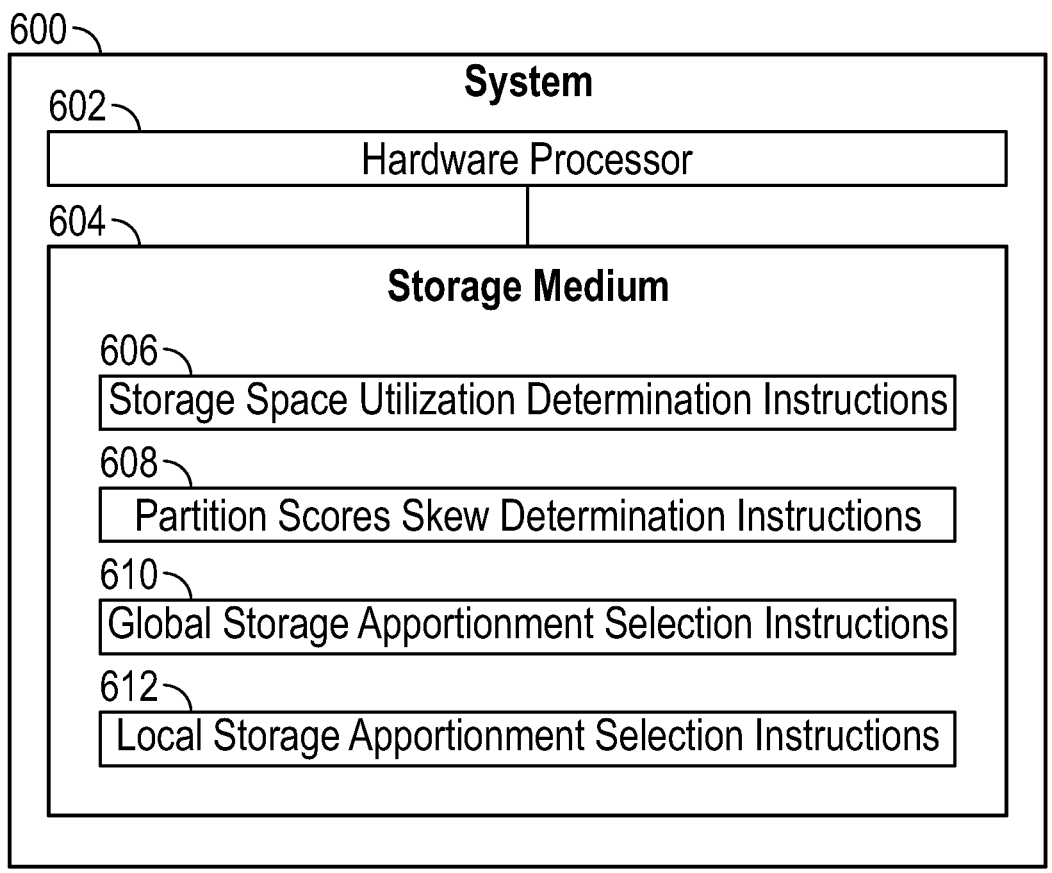
FIG. 6 is a block diagram of a system according to some examples.

FIG. 6 is a block diagram of a system 600 according to some examples. The system 600 can include the computer nodes 104-1 to 104-N of FIG. 1, for example. In other examples, the system 600 can include a single computer node.

The system 600 includes a hardware processor 602 (or multiple hardware processors). A hardware processor can include a microprocessor, a core of a multi-core microprocessor, a microcontroller, a programmable integrated circuit, a programmable gate array, or another hardware processing circuit.

The system 600 includes a non-transitory storage medium 604 storing machine-readable instructions executable on the hardware processor 602 to perform various tasks. Machine-readable instructions executable on a hardware processor can refer to the instructions executable on a single hardware processor or the instructions executable on multiple hardware processors.

The machine-readable instructions in the storage medium 604 include storage space utilization determination instructions 606 to determine whether storage space utilizations of respective partitions of a shared storage by a plurality of data services are within a threshold difference (e.g., space usage pressure measures are substantially the same).

The machine-readable instructions in the storage medium 604 include partition scores skew determination instructions 608 to determine whether scores computed for respective partitions (such as according to Equation 1) of the shared storage are skewed.

The machine-readable instructions in the storage medium 604 include global storage apportionment selection instructions 610 to, in response to determining that the storage space utilizations are not within the threshold difference, and in response to determining that the scores computed for the respective partitions are skewed, select a global storage apportionment process that comprises releasing a first partition of the plurality of partitions that was allocated to a first data service for allocation to another data service.

The machine-readable instructions in the storage medium 604 include local storage apportionment selection instructions 612 to, in response to determining that the storage space utilizations are within the threshold difference, or in response to determining that the scores computed for the respective partitions are not skewed, select a local storage apportionment process that cleans segments in the first partition based on scores computed for the segments in the first partition.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

allocate a plurality of partitions of a shared storage to respective data services; and based on respective utilizations of the plurality of partitions, select, for a given data service of the data services, between a global storage apportionment process to rebalance shares of the shared storage among the data services, and a local storage apportionment process, the rebalancing comprising releasing a partition of the given data service, and the local storage apportionment process comprising freeing segments within the partition of the given data service.

2. The non-transitory machine-readable storage medium of claim 1, wherein the selecting is performed as part of a garbage collection process.

3. The non-transitory machine-readable storage medium of claim 1, wherein the instructions upon execution cause the system to:

select the global storage apportionment process in response to a difference between indicators of utilizations of respective storage spaces of the shared storage by the respective data services exceeding a threshold difference.

4. The non-transitory machine-readable storage medium of claim 3, wherein a storage space used by a data service of the data services comprises one or more partitions.

5. The non-transitory machine-readable storage medium of claim 3, wherein each respective indicator of the indicators comprises:

a measure based on relative usage of a storage space allocated to a corresponding data service of the data services.

6. The non-transitory machine-readable storage medium of claim 3, wherein the instructions upon execution cause the system to:

compute scores for respective partitions of the plurality of partitions, each score of the scores for a corresponding partition based on a utilization of the corresponding partition by a corresponding data service; and select the global storage apportionment process for the given data service in response to a comparison of the scores.

7. The non-transitory machine-readable storage medium of claim 6, wherein each score of the scores for the corresponding partition is further based on an age of the corresponding partition.

8. The non-transitory machine-readable storage medium of claim 6, wherein the instructions upon execution cause the system to:

select the global storage apportionment process for the given data service further in response to the scores being skewed.

9. The non-transitory machine-readable storage medium of claim 3, wherein the instructions upon execution cause the system to:

select the local storage apportionment process in response to the difference between the indicators not exceeding the threshold difference.

10. The non-transitory machine-readable storage medium of claim 3, wherein the instructions upon execution cause the system to:

compute scores for respective partitions of the plurality of partitions, each score of the scores for a corresponding partition based on a utilization of the corresponding partition by a corresponding data service; and select the local storage apportionment process to perform for the given data service further in response to a comparison of the scores indicating that a global storage apportionment process is to be performed for another data service.

11. The non-transitory machine-readable storage medium of claim 10, wherein the instructions upon execution cause the system to:
compute segment scores for respective segments in the partition of the given data service, wherein the local storage apportionment process is based on the segment scores.

12. The non-transitory machine-readable storage medium of claim 11, wherein each segment score of the segment scores is further based on an age of a corresponding segment of the segments.

13. The non-transitory machine-readable storage medium of claim 11, wherein the instructions upon execution cause the system to:
compute scores for multiple partitions allocated to the given data service, each score of the scores for a corresponding partition of the multiple partitions based on a respective utilization of the corresponding partition by the given data service;
compare the scores for the multiple partitions; and
based on comparing the scores for the multiple partitions, select a partition of the multiple partitions to which the local storage apportionment process is applied.

14. The non-transitory machine-readable storage medium of claim 1, wherein the instructions upon execution cause the system to:
compute scores for respective partitions of the plurality of partitions, each score of the scores for a corresponding partition based on a utilization of the corresponding partition by a corresponding data service; and
select the local storage apportionment process in response to the scores not being skewed.

15. The non-transitory machine-readable storage medium of claim 1, wherein the instructions upon execution cause the system to:
allocate a new partition to a first data service of the data services based on the respective utilizations of the plurality of partitions.

16. The non-transitory machine-readable storage medium of claim 13, wherein the instructions upon execution cause the system to:
allocate the new partition to the first data service further based on indicators of utilizations of respective storage spaces of the shared storage by the respective data services.

17. A system comprising:
a processor; and
a non-transitory storage medium storing instructions executable on the processor to:
determine whether storage space utilizations of respective partitions of a shared storage by a plurality of data services are within a threshold difference, and determine whether scores computed for respective partitions of a plurality of partitions of the shared storage are skewed;
in response to determining that the storage space utilizations are not within the threshold difference, and in response to determining that the scores computed for the respective partitions are skewed, select a global storage apportionment process that comprises releasing a first partition of the plurality of partitions that was allocated to a first data service for allocation to another data service; and
in response to determining that the storage space utilizations are within the threshold difference, or in response to determining that the scores computed for the respective partitions are not skewed, select a local storage apportionment process that cleans segments in the first partition based on scores computed for the segments in the first partition.

18. The system of claim 17, wherein the scores computed for the respective partitions are based on respective utilizations of the respective partitions, and the scores computed for the segments in the first partition are based on respective utilizations of the segments in the first partition.

19. A method performed by a system comprising a hardware processor, comprising:
determining whether a shared storage re-apportionment criterion is satisfied;
in response to determining that the shared storage re-apportionment criterion is not satisfied:
perform a local storage apportionment process that apportions a first partition of a shared storage based on local information associated with the first partition, the local information based on utilizations of segments of the first partition, wherein the shared storage is divided into a plurality of partitions allocated to respective data services; and
in response to determining that the shared storage re-apportionment criterion is satisfied:
perform a global storage apportionment process that apportions the shared storage based on global information that is based on utilizations of respective partitions of the plurality of partitions by the respective data services, wherein the apportioning of the shared storage based on the global information comprises releasing a partition of a first data service of the data services to make the released partition available for another data service of the data services.

20. The method of claim 19, wherein the local information is further based on ages of the segments of the first partition, and the global information is further based on ages of the respective partitions.

* * * * *